(12) United States Patent
Beck

(10) Patent No.: US 7,352,948 B2
(45) Date of Patent: Apr. 1, 2008

(54) SERVICE BLOCKER DEVICE AND METHOD

(75) Inventor: Ronald A. Beck, St. Paul, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 11/636,372

(22) Filed: Dec. 8, 2006

(65) Prior Publication Data

US 2007/0177843 A1 Aug. 2, 2007

Related U.S. Application Data

(63) Continuation of application No. 11/010,460, filed on Dec. 13, 2004, now Pat. No. 7,167,628.

(51) Int. Cl.
*G02B 6/36* (2006.01)
*G02B 6/00* (2006.01)

(52) U.S. Cl. .......................... 385/139; 385/76; 385/77; 385/78; 385/53; 385/134; 385/138

(58) Field of Classification Search .................. 385/53, 385/95, 55, 56, 58, 59, 60, 70, 71, 72, 76, 385/77, 78, 85, 96, 99, 139, 138, 137, 73, 385/75, 19, 134, 136; 398/83, 85
See application file for complete search history.

(56) References Cited

U.S. PATENT DOCUMENTS

| | | | |
|---|---|---|---|
| 5,619,610 A | 4/1997 | King et al. | 385/139 |
| 6,102,581 A | 8/2000 | Deveau et al. | 385/56 |
| 6,240,229 B1 | 5/2001 | Roth | 385/53 |
| 6,438,310 B1 | 8/2002 | Lance et al. | 385/135 |
| 6,461,053 B1 | 10/2002 | Mayercik et al. | 385/56 |
| 6,504,988 B1 | 1/2003 | Trebesch et al. | 385/135 |
| 6,612,750 B1 | 9/2003 | Bull et al. | 385/65 |
| 6,688,780 B2 | 2/2004 | Duran | 385/76 |
| 6,715,928 B1 | 4/2004 | Matasek et al. | 385/56 |
| 7,167,628 B2* | 1/2007 | Beck | 385/139 |

(Continued)

FOREIGN PATENT DOCUMENTS

DE 37 35 038 A1 4/1989 ............... 385/77 X (Continued)

OTHER PUBLICATIONS

Ex. A, ADC Telecommunications, Inc., Network Connectivity Sonl'ns Doc. No. M143, dated Aug. 2003, cover and p. 174.

(Continued)

*Primary Examiner*—Brian M. Healy
(74) *Attorney, Agent, or Firm*—Merchant & Gould P.C.

(57) ABSTRACT

A device and method of blocking customer access to a fiber optic distribution cable. A service blocker is positioned between a fiber distribution cable and a customer drop cable within a fiber optic adapter. The service blocker includes a body which does not permit optical transmission between the fiber distribution cable and the customer drop cable. The service blocker includes a first end configured to be inserted within the fiber optic adapter and a second end configured connect with a fiber optic cable connector. A system for mounting fiber optic cables including a service blocker positioned within a bulkhead mounted adapter between two fiber optic cables.

20 Claims, 6 Drawing Sheets

U.S. PATENT DOCUMENTS

| | | | |
|---|---|---|---|
| 7,198,409 B2 * | 4/2007 | Smith et al. | 385/53 |
| 2003/0002812 A1 | 1/2003 | Lampert | 385/78 |
| 2003/0147618 A1 | 8/2003 | Guy et al. | 385/139 |
| 2004/0161202 A1 | 8/2004 | Estrella et al. | 385/53 |
| 2004/0264873 A1 * | 12/2004 | Smith et al. | 385/53 |
| 2005/0213897 A1 | 9/2005 | Palmer et al. | 385/95 |
| 2007/0025674 A1 | 2/2007 | Kowalczyk et al. | 385/134 |
| 2007/0177843 A1 * | 8/2007 | Beck | 385/59 |

FOREIGN PATENT DOCUMENTS

| | | | | |
|---|---|---|---|---|
| EP | 0 341 919 A2 | 11/1989 | | 385/134 |
| EP | 0 967 497 A1 | 12/1999 | | 385/134 X |
| WO | WO 2005/006783 A2 | 1/2005 | | 385/134 X |

OTHER PUBLICATIONS

Ex. B, ADC Telecommunications, Inc., Fiber Optic Adapter with DustPlugs © 2005, 1 page.

Ex. C., ADC Telecommunications, Inc., ADC FasTerm Singlemode ST Installation Instructions, Doc. No. 1077662 Rev A © 1999, 25 pp.

Ex. D., ADC Telecommunications, Inc., ADC FasTerm Multimode SC Connector Installation Instructions, Doc. No. 1077650 Rev A © 1999, 22 pp.

King, W. et al., "Low-Cost Connector-Type Optical Terminators," *Electronic Components and Technology Conference*, pp. 414-418 (1997).

Sys. Concept Inc., Dust Caps web page with prints of various products listed on the web page © 2003-2005, 14 pp.

King, W. et al., "Low-Cost Connector-Type Optical Terminators," *Electronic Components and Technology Conference*, pp. 414-418 (1997).

Prosecution History of U.S. Appl. No. 11/138,667 (OA May 16, 2007; Resp. Aug. 16, 2007).

\* cited by examiner

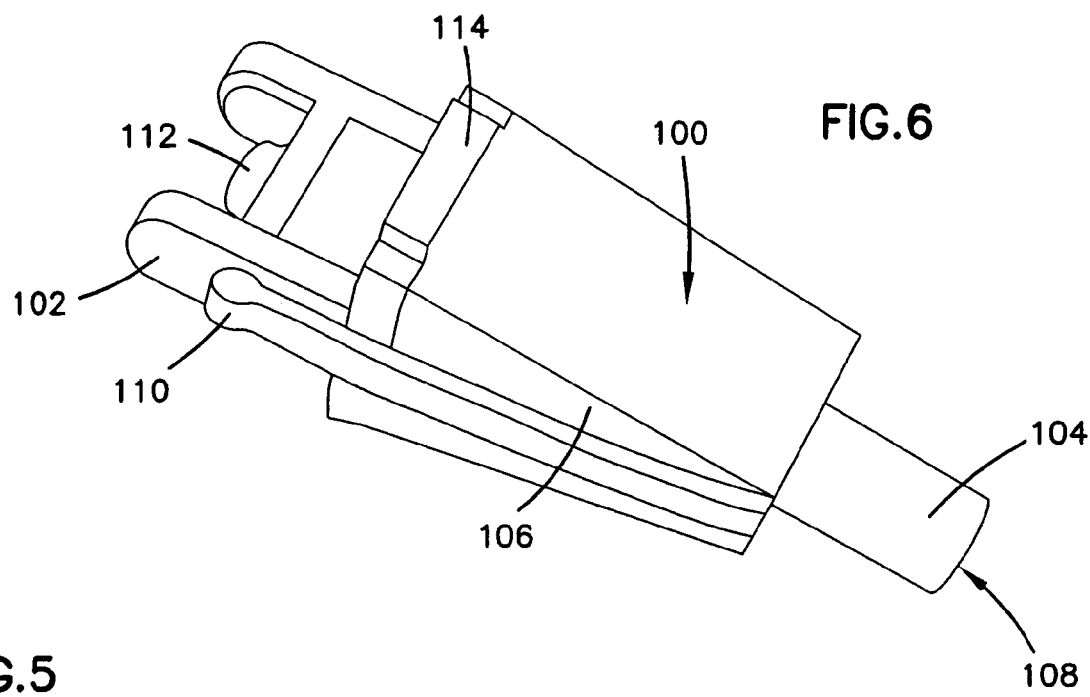
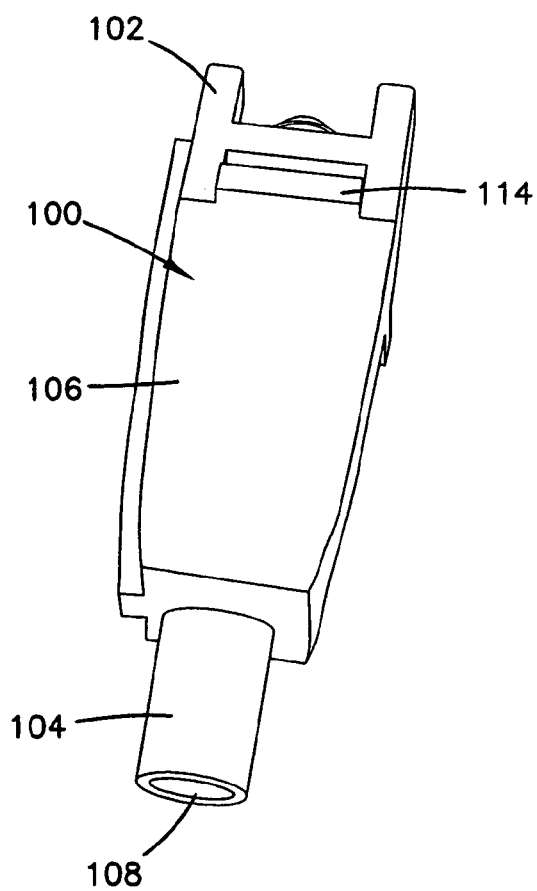
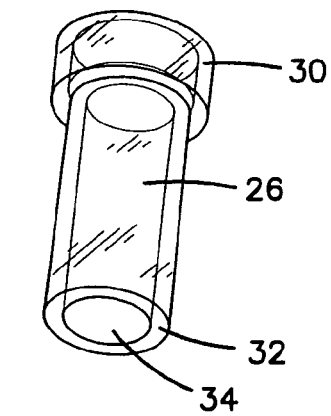

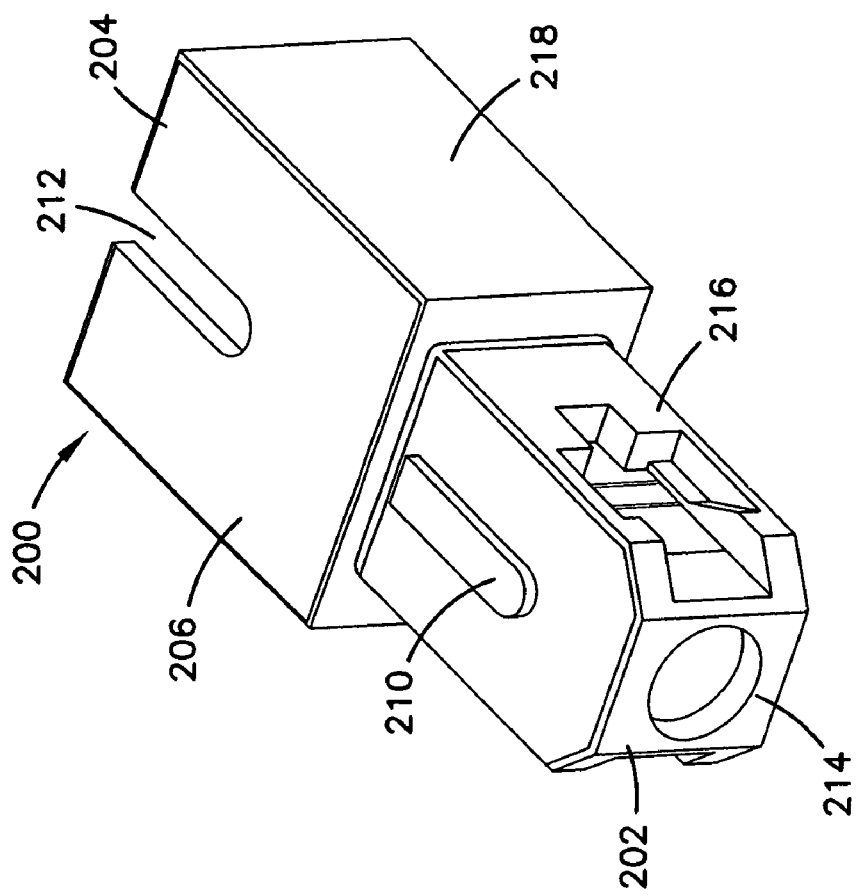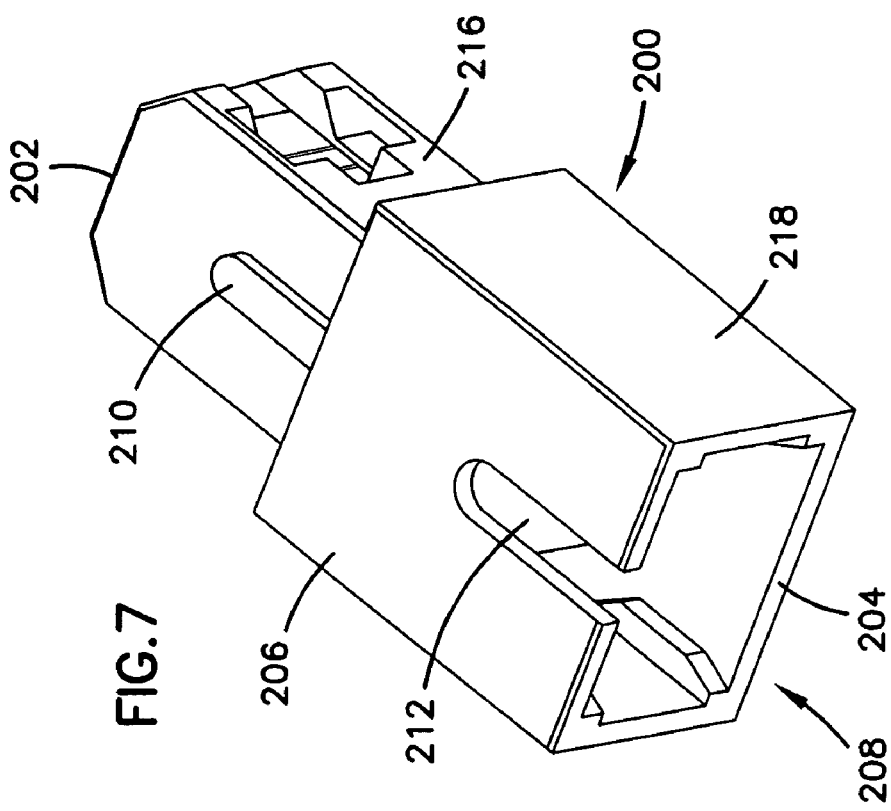

SERVICE BLOCKER DEVICE AND METHOD

This application is a continuation of application Ser. No. 11/010,460, filed Dec. 13, 2004, now U.S. Pat. No. 7,167,628, which application is incorporated hereidby reference.

TECHNICAL FIELD

The present invention relates generally to provision of optical fiber telecommunications service. More specifically, the present invention relates to a device and method for blocking a connection between a customer and optical fiber services.

BACKGROUND

As demand for telecommunications services increases, optical fiber services are being extended into more and more areas. Often, it is more cost effective to provide for greater service capacity than current demand warrants. This will allow a telecommunications service provider to quickly and cost-effectively respond to future growth in demand. Optical fiber cables may be extended to a customer's premises prior to that customer actually requesting or needing service. Such cables may be extended to premises adjacent the premises of a current customer, as it may be cost effective to extend both cables at the same time, or the cables may be extended to new building sites in anticipation of the new occupants of those sites requesting fiber optic service.

When cables are extended in anticipation of future service expansion, it is desirable to provide for blocking illumination of the future customers drop cable prior to that customer requesting the service.

SUMMARY

The present invention relates to a service blocking device with a body including a first end and a second end. The first end is configured to be received within an opening of a fiber optic adapter. The second end includes an opening configured to fit about a ferrule of a fiber optic connector, the fiber optic connector configured to be received within the opening of the fiber optic adapter. The body is configured so that the fiber optic connector is held generally coaxially aligned with the opening of the adapter when the first end of the body is within the opening of the adapter and the second end of the body is positioned about the ferrule of the fiber optic connector. The body defines an optically opaque light path between the first end and the second end to prevent light from passing through the body from the terminal end of the fiber optic cable through the second end of the adapter.

The present invention further relates to connecting a customer drop cable to a fiber distribution cable by removing a service blocker from an adapter between the two cables and preventing connection of a customer drop cable to a fiber distribution cable by inserting a service blocker into an adapter between the cables.

BRIEF DESCRIPTION OF THE DRAWINGS

The accompanying drawings, which are incorporated in and constitute a part of the specification, illustrate several aspects of the present invention and together with the description, serve to explain the principles of the invention. A brief description of the drawings is as follows:

FIG. 3 is a perspective view of the prior art dust cap of FIG. 2.

FIG. 5 is an end perspective view of the service blocking device of FIG. 4, removed from the connector.

FIG. 6 is a side perspective view of the service blocking device of FIG. 5.

FIG. 7 is a perspective view of a second embodiment of a service blocking device according to the present invention.

FIG. 8 is a second perspective view of the service blocking device of FIG. 7, viewed from the opposite end.

DETAILED DESCRIPTION

Reference will now be made in detail to the exemplary aspects of the present invention that are illustrated in the accompanying drawings. Wherever possible, the same reference numbers will be used throughout the drawings to refer to the same or like parts.

Figure 1:
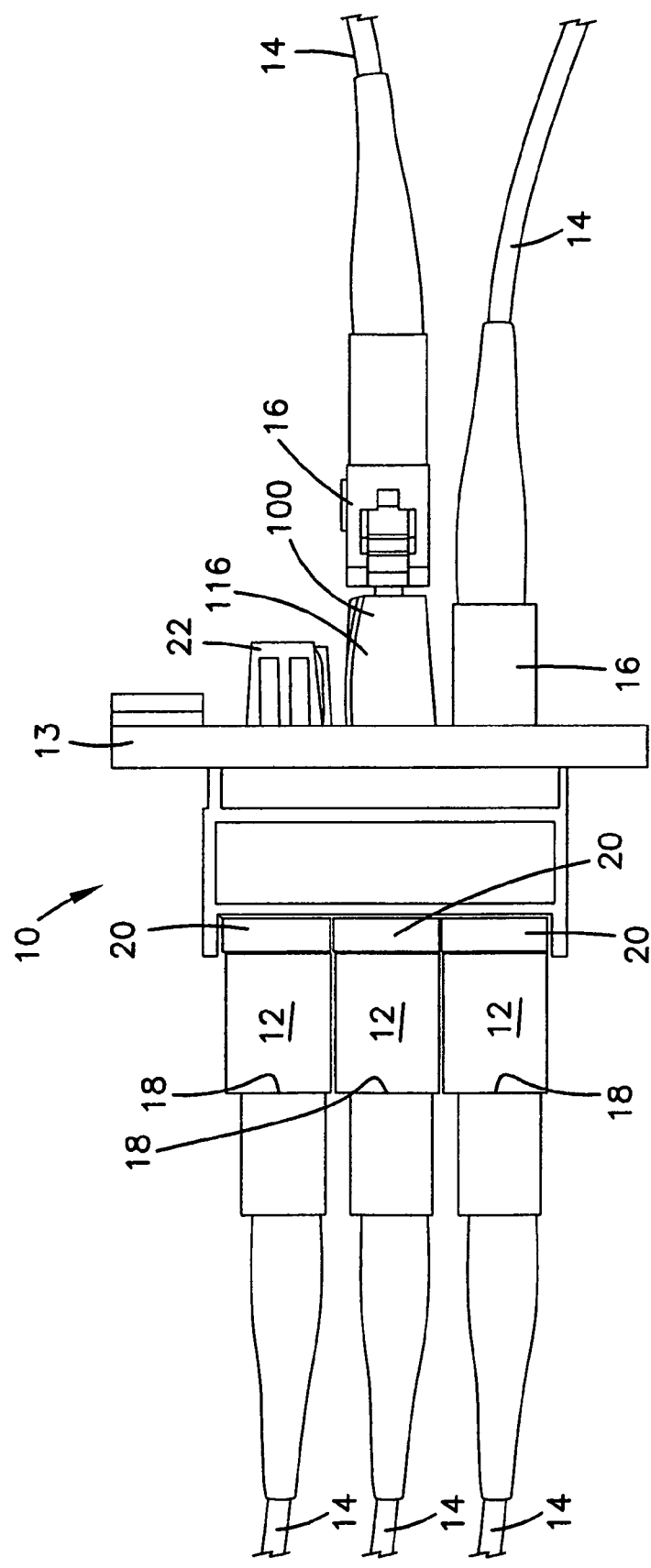
FIG. 1 is a side view of a telecommunications connection block for fiber optic cables terminated with connectors, with a service blocking device inserted between one of the connectors and the adapter.

FIG. 1 illustrates a sliding adapter pack 10 including a three fiber optic adapters 12 mounted in a sliding frame 13. Adapter packs such as theses shown in commonly owned U.S. Pat. Nos. 5,504,988 and 6,438,310, the disclosures of which are incorporated herein by reference. However the adapters may be mounted or held, such as mounted to a bulkhead, a panel, within a drawer, or other piece of equipment, the discussion below regarding fiber optic cables, connectors and adapters is generally applicable. While FIG. 1 illustrates adapters 12 mounted within sliding pack 10, adapters 12 could be mounted in a variety of other settings, either alone, in combination with each other, or in conjunction a plurality of other adapters 12. Adapters 12 align fiber optic connectors, such as connectors 16, which terminate fiber optic cables, such as cables 14, to permit optical signals to be transmitted from one cable 14 to another cable 14, such as shown in the lowest positioned adapter 12 in sliding frame 13. Adapter 12 includes a first end 18 and a second opposing end 20 for receiving connectors 16. As shown, both ends of adapter 12 are adapted to receive and optically connect connectors 16 which conform to a known SC format. Alternatively, adapters 12 may be configured to receive and optically connect connectors 16 that conform to other formats and styles.

As shown in FIG. 1, one of the connectors 16 is inserted within first end 18 of the top most adapter 12 and an adapter dust cap 22 is inserted within second end 20 of that adapter 12. Adapter dust cap 22 fits closely within one of the openings 18 and 20 to provide a seal against intrusion of dust or other contaminants into adapter 12. As shown in the lower most adapter 12, another connector 16 terminating another cable 14 could be inserted within second end 20 of the same adapter 12 so that the two cables 14 could be optically connected. The upper and lower adapters in FIG. 1 illustrate those connection or disconnection arrangements of connectors that are currently used in the telecommunications industry.

The cable/adapter arrangement shown in the lowest position in FIG. 1 is well known in the telecommunications industry and permits, for example, customer service or drop cables to be connected to fiber optic distribution cables to provide fiber optic service to a customer. However, when a customer drop cable has been extended to a customer premises prior to and in anticipation of that customer requesting the service, it is desirable that the optical path between the two cables 14 be broken. One current method of breaking the optical path is illustrated in the top most position in FIG. 1, where one of the cables 14 is removed from the adapter 12 and adapter dust cap 22 inserted in its place. The removed cable 14 is then stored somewhere else within the installation in anticipation of connecting the two cables at the top most adapter 12. It is also desirable to have the two cables 14 positioned as closely as possible to each other so that turning on service to the customer upon request is simple and efficient. Since some installations of connection locations include a large number of adapters 12, it is desirable that those connections between cables which have been interrupted be quickly visible to a field technician.

Between the connector 16 and adapter 12 in the middle position of sliding frame 13, a service blocking device 100 is positioned. Service blocking device 100 maintains the connector 16 generally in alignment with adapter 12, but interrupts the optical path from the terminal end of cable 14 held by connector 16. As can be seen from FIG. 1, device 100 provides an offset mounted of connector 16 to adapter 12, making the location of connectors where service has been interrupted fairly obvious, even in a crowded enclosure. Device 100 may also have an exterior color which is distinct from other colors found adjacent adapters 12 and distinct from the connectors 16 and cables 14. This will further assist in a quick visual indication of which circuits include devices 100 when a technician accesses a service panel.

It is desirable that adapters 12 might be installed in a factory pre-wired panel with cables 14 extending to both sides of adapters 12 and service blocking devices 100 in place between cables and cables 14 on one side of the panel. The panel could then be installed in the field as needed without cable re-routing within the panel required by the installer. This similar in nature to the parking lot concept incorporated in commonly owned U.S. patent application Ser. No. 10/871,555, filed Jun. 18, 2004, the disclosure of which is incorporated herein by reference. In such a parking lot configuration, normally one side of installed adapters 12 be fully populated with cables 14, such as shown on the left side of sliding frame 13 of FIG. 1.

Figure 2:
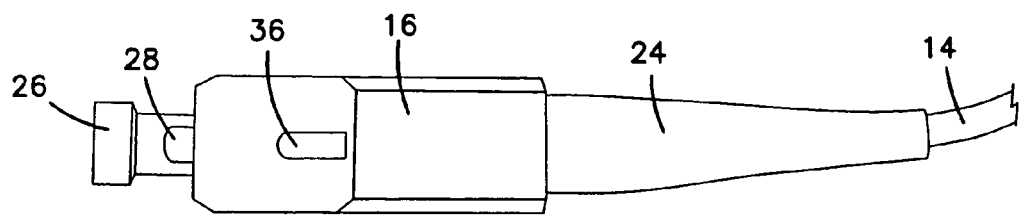
FIG. 2 is a side view of a fiber optic telecommunications cable with a prior art dust cap positioned about a terminal end of the optical fiber within the cable.

Referring now to FIG. 2, connector 16 is shown with a known connector dust cap 26 positioned about a ferrule 28 held by connector 16. The terminal end of the optical fiber within cable 14 is held by ferrule 28. Connector dust cap 26 fits tightly about ferrule 28 to protect the terminal end from dust or other contaminants when connector 16 is not in use transmitting optical signals. Connector dust cap 26, as shown in FIG. 3, includes an enlarged end 30 to permit grasping of dust cap 26 to remove it from ferrule 28 of connector 16, and an opening 34 at an opposite end 32. Opening 34 is sized to receive and closely fit about ferrule 28 of connector 16. As shown, connector dust cap 26 is often made of a clear pliable material and its size will not permit it to be received within either opening 18 or 20 of adapter 12. Connector 16 also includes a keying feature 36, which engages a mating recess or slot of adapter 12 to ensure that connector 16 is inserted within adapter 12 is the correct orientation.

Figure 4:
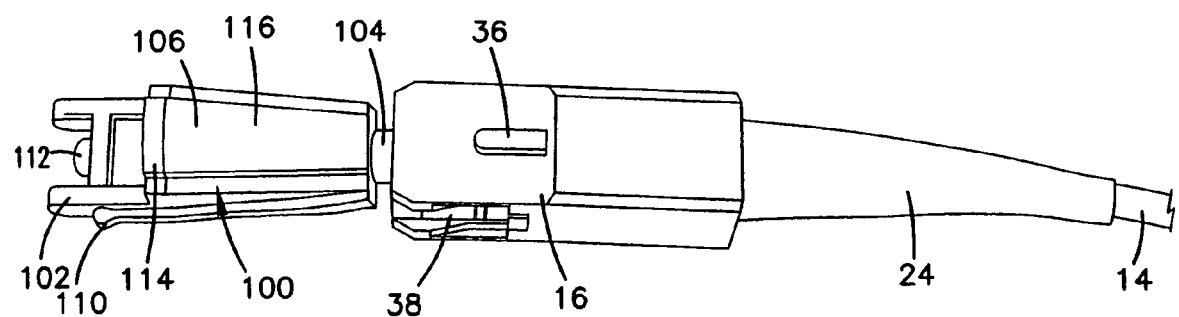
FIG. 4 is a side view of the service blocking device and one of the fiber optic telecommunications cables of FIG. 1, removed from the adapter.

FIG. 4 shows connector 16 with service blocking device 100 mounted about ferrule 28. Service blocking device 100 includes a body 106 with a first end 102 configured similar to adapter dust cap 22 for being received with one of the ends 18 and 20 of adapter 12, and a second opposing end 104 sized to receive and fit closely about ferrule 28. First end 102 of service blocking device 100 acts as a dust cap to seal one of the openings 18 and 20 of adapter 12, similar to adapter dust cap 22. Second end 104 of service blocking device 100 acts as a dust cap for ferrule 28 and the terminal end of the optical fiber of cable 14 held by ferrule 28, similar to connector dust cap 26. Body 106 is made of a material preferably sufficiently pliable to permit deforming to achieve an adequate seal of either ferrule 28 or either adapter end 18 and 20. Body 106 is also made of an optically opaque material, to prevent optical signals from passing between cables 14. Alternatively, body 106 may include an intermediate bulkhead 114 of body 106 which may be sized and shaped to closely match the size and shape of the opening in either first end 18 or second end 20 of adapter 12. Intermediate bulkhead 114 may extend across the light path between first end 102 and second end 104 and prevent passage of light signals through body 106 between the ends 102 and 104.

Body 106 may also include a keying feature 110 which engages a recess or slot of adapter 12 to properly orient first end 102 within adapter 12. Orientation of device 100 in adapter 12 helps ensure that extension 112 of first end 102 will mate with and provide a contamination seal about a split sleeve or other ferrule alignment feature within adapter 12. It is also anticipated that body 106 could be configured without such a keying feature 110.

Referring now to FIGS. 7 and 8, an alternative embodiment of a service blocking device 200 is shown. Device 200 includes a body 206 with a first end 202 and a second end 204. Second end 204 defines an opening 208 to receive connector 16. An alignment slot 212 in one side of opening 208 engages keying feature 36. Body 206 may also include an optional keying feature 210 adjacent first end 202 to engage a recess or slot in adapter 12. First end 202 further defines an opening 214 to permit a split sleeve or other ferrule alignment feature within adapter 12 to be received within body 206. Between first end 202 and second end 204, within body 206 is an optically opaque element which prevents light or optical signals from passing through service blocker device 200. Body 206 does not define a continuous light path between first end 202 and second end 204.

Body 206 also includes a first portion 216 adjacent first end 202 and a second portion 218 adjacent second end 204. First portion 216 is sized to fit within one of the ends 18 or 20 of adapter 12 and extend deep enough into adapter 12 so that opening 214 fits about and provides a seal from dust or other contamination about the ferrule alignment feature within adapter 12. Second portion 218 is sized to permit opening 208 to be large enough to accommodate a connector 16 but not so large as to interfere with connectors inserted within adjacently positioned adapters 12. Second portion 218 extends beyond the end of adapter 12 and offsets connector 16 away from adapter 12 to provide a quick visual indication of the position of service blocking device 200.

With reference to both bodies 106 and 206, it is desirable that at least a portion of the bodies extends outside of adapter 12 between adapter 12 and connector 16 to aid in the dissipation of any heat built up within the bodies. The optical signals whose passage through bodies 106 and 206 are being blocked are typically in the form of modulated laser light. Laser light, particularly at higher levels of energy that are being increasingly used in telecommunications, may cause a heat built up with bodies 106 and 206 as signals passing through cable 14 are blocked. This heat build up needs to be dissipated to prevent damage to cable 14, connector 16, ferrule 28 or adapter 12, or other equipment. By having at least a portion 116 of each body 106 (as shown in FIG. 1) or portion 218 of body 206 outside of adapter 12, the heat built up within the bodies may be more easily dissipated, as opposed to being confined within adapter 12. Additionally, at least these portions 116 and 218 of bodies 106 and 206, respectively, may be made of a material chosen for heat transmissive, or optical energy absorption or reflection qualities. These colors of the materials of devices 100 and 200 may also be selected to improve contrast with the other colors adjacent adapters 12, connectors 16 and cables 14 to improve the visual identification of circuits including devices 100 or 200.

Figure 9:
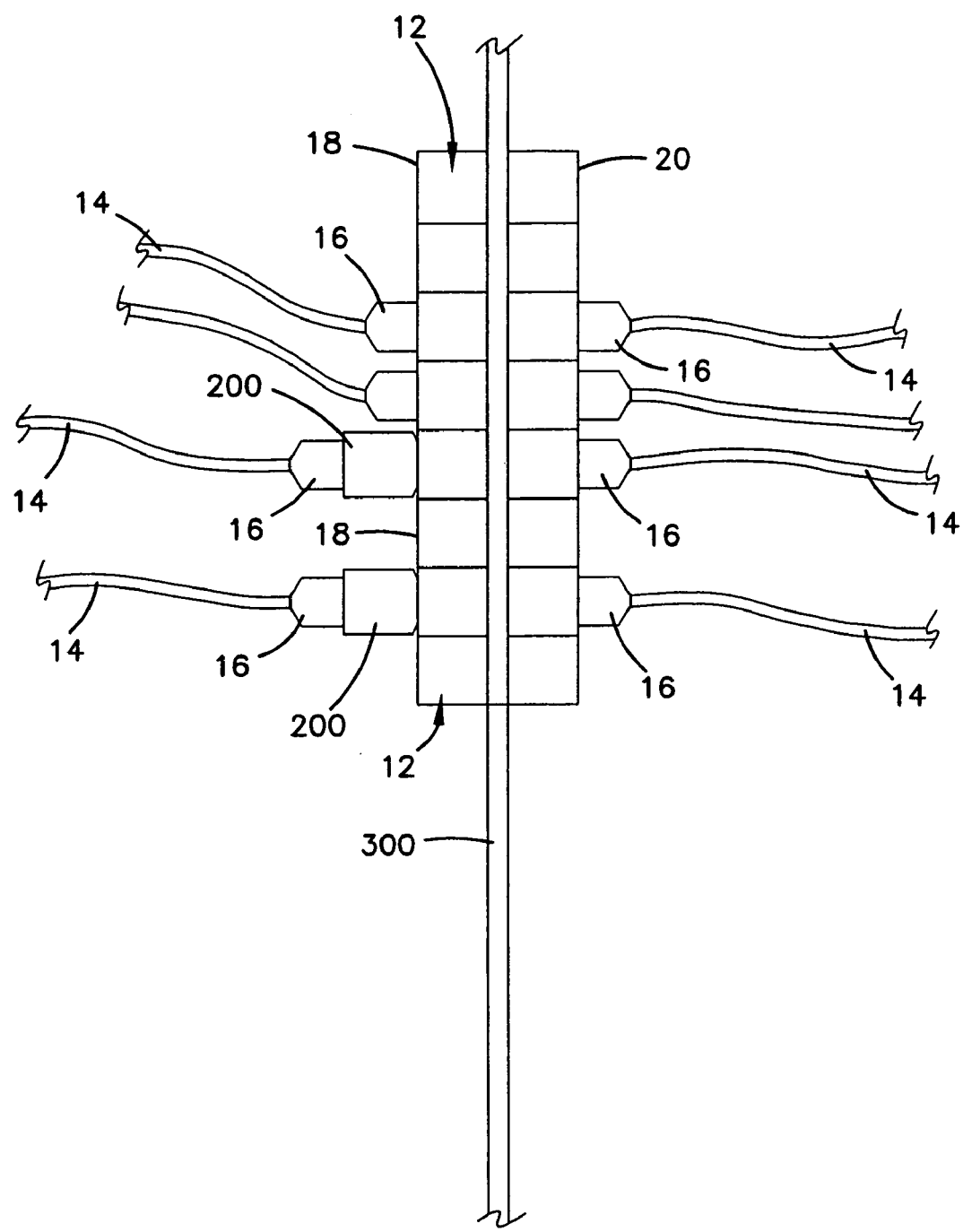
FIG. 9 is a side view of a bulkhead with a plurality of fiber optic adapters and fiber optic cables extending to the adapters.

FIG. 9 shows a bulkhead 300, such as might be included in a fiber optic module or panel, through which a plurality of fiber optic adapters 12 extend. First end 18 and second end 20 of adapters 12 are on opposite side of bulkhead 300. Cables 14 with connectors 16 extend to either end 18 or 20 of adapters 12. In some adapters 12, service blocking devices 200 are positioned between connector 16 of cable 14 and an opening in first end 18 of adapter 12. Another connector 16 of a corresponding cable 14 is inserted directly within the opposite end 20 of adapter 12. In other adapters 12, connectors 16 of cables 14 are inserted directly into both ends 18 and 20. Service blocking devices 200 position the inserted connectors 16 and cables 14 offset from the adapters, making these blocked cables easy to spot in the field by service personnel visiting the installation where bulkhead 300 is mounted.

Figure 10:
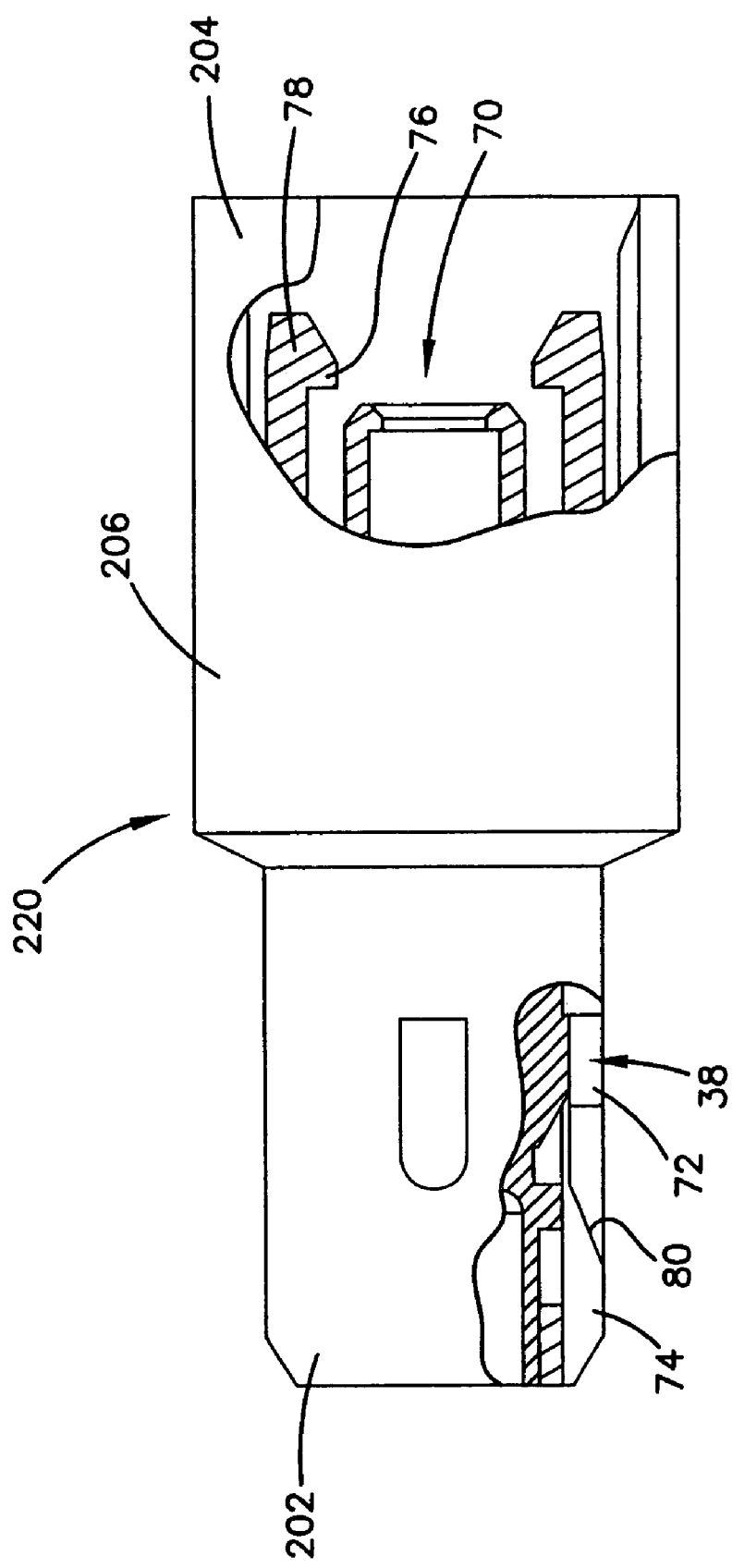
FIG. 10 is a partial cross-sectional view of a third embodiment of a service blocking device according to the present invention, showing releasable latches and engagement structures of the first and second ends of the device.

Devices 100 and 200 may be releasably held with one of the ends 18 or 20 of adapter 12 by a friction fit or by a releasable mechanism, such as catch 38, included in connector 16 (shown in FIG. 4). Devices 100 and 200 may also include a friction fit or mating structure which mates with catch 38 for releasably holding connector 16. FIG. 10 illustrates a partial cross-sectional view of first end 202 of an alternative embodiment device 220 showing additional detail of catch 38. FIG. 10 also shows a partial cross-sectional view of second end 204 of device 220 with a mating structure 70. It is anticipated that ends 18 and 20 of adapter 12 may also include mating structures 70. Catch 38 of device 220 includes a recess 72 and a sliding portion 74. When first end 202 is inserted within adapter 12, a catch 76 on a distal end 78 of mating structure 70 engages recess 72 on either side of first end 202. The engagement of catches 76 and recesses 72 on opposite sides of first end 202 cooperate to hold device 220 within adapter 12.

To remove device 220 from adapter 12, a technician would grasp body 206 of which sliding portion 74 is an integral part, and pull body 206 away from adapter 12. Doing so will cause sliding portion 74 to translate relative to recess 72 so that tapered leading edge 80 engages catches 76 and urges them outward from recesses 72, deflecting mating structure 70. Once mating structure 70 has been sufficiently deflected outward, first end 202 of device 220 may be removed from adapter 12. Catch 38 of connector 16 is similarly configured to permit insertion within second end 204 of device 220 and engagement of mating structure 70 and subsequent disengagement of mating structure 70 and removal of connector 16 from second end 204.

It is anticipated that devices 100, 200 and 220 may be made of a relatively inexpensive and disposable material and that the devices may be simply discarded once they have been removed from an adapter in the field.

The above specification, examples and data provide a complete description of the manufacture and use of the invention. Since many embodiments of the invention can be made without departing from the spirit and scope of the invention, the invention resides in the claims hereinafter appended.

What is claimed is:

1. A fiber connector system comprising:
a fiber optic adapter with first and second opposing ends, the fiber optic adapter being for aligning and optically connecting a pair of fiber optic connectors inserted into openings in the opposing ends of the fiber optic adapter;
a fiber optic connector for mounting to and terminating an end of a fiber optic cable, the fiber optic connector including a ferrule at a first end of the fiber optic connector, the first end of the fiber optic connector sized to be inserted within the opening at the first end of the fiber optic adapter;
a service blocker with a first end and a second end, the first end of the service blocker positioned within and closing off the first end of the fiber optic adapter, the first end of the service blocker forming a first latching interface with the first end of the fiber optic adapter, the second end of the service blocker positioned about the end of the fiber optic cable terminated in the fiber optic connector, the second end of the service blocker forming a second latching interface with the fiber optic connector.

2. The fiber connector system of claim 1, wherein the service blocker further includes a body which is configured to dissipate heat generated by optic signals transmitted through the fiber optic adapter and whose passage to the fiber optic cable is blocked by the body.

3. The fiber connector system of claim 2, wherein the body of the service blocker is colored distinctly from the fiber optic connector.

4. The fiber connector system of claim 1, wherein the fiber optic connector is offset from the fiber optic adapter by the service blocker.

5. The fiber connector system of claim 1, wherein the first end of the service blocker is configured as a dust cap for insertion within the first end of the fiber optic adapter.

6. The fiber connector system of 1, wherein the first end of the service blocker is configured as the fiber optic connector without the ferrule.

7. The fiber connector system of claim 1, wherein the second end of the service blocker is configured as a dust cap sized to fit closely about the ferrule of the fiber optic connector.

8. The fiber connector system of claim 1, wherein the second end of the service blocker is configured like one of the ends of the fiber optic adapter.

9. The fiber connector system of claim 1, wherein the service blocker further includes a body defining an optically opaque light path between the first end and the second of the service blocker to prevent light from passing through the body from the first end of the service blocker to the second end of the service blocker.

10. The fiber connector system of claim 1, wherein the first and second latching interfaces include deflectable catches configured to engage recesses.

11. The fiber connector system of claim 1, wherein the first latching interface includes a first deflectable catch of the fiber optic adapter configured to engage a first recess formed adjacent the first end of the service blocker and wherein the second latching interface includes a second deflectable catch of the service blocker configured to engage a second recess formed on the fiber optic connector.

12. A system for mounting fiber optic cables comprising:
a bulkhead with a plurality of fiber optic adapters extending through the bulkhead, each adapter having a first end and an opposing second end;
a first fiber optic cable with a first connector inserted within the first opening of at least one of the fiber optic adapters;
a service blocker inserted within the second end of the adapter opposite the first fiber optic cable, the service blocker including a first connector end which is within the adapter and a second adapter end including an opening, the first connector end of the service blocker forming a first latching interface with the second end of the adapter;
a second fiber optic cable with a second connector inserted within the second adapter end of the service blocker, the second connector forming a second latching interface with the second adapter end of the service blocker;
the service blocker preventing transmission of optical signals between the first and second fiber optic cables.

13. The system of claim 12, wherein the second connector is held by the service blocker in a position offset from the second end of the adapter.

14. The system of claim 12, wherein the service blocker further includes a body which is configured to dissipate heat generated by optic signals transmitted through the fiber optic adapter and whose passage to the second fiber optic cable is blocked by the body.

15. The system of claim 12, wherein the body of the service blocker is colored distinctly from the fiber optic connectors.

16. The system of claim 12, wherein the first connector end of the service blocker is configured as a dust cap for insertion within the second end of the fiber optic adapter.

17. The system of claim 12, wherein the second adapter end of the service blocker is configured as a dust cap sized to fit closely about a ferrule of the second fiber optic connector.

18. The systeln of claim 12, wherein the service blocker further includes a body defining an optically opaque light path between the first connector end and the second adapter end of the service blocker to prevent light from passing through the body from the first connector end of the service blocker to the second adapter end of the service blocker.

19. The system of claim 12, wherein the first and second latching interfaces include deflectable catches configured to engage recesses.

20. The system of claim 12, wherein the first latching interface includes a first deflectable catch of the fiber optic adapter configured to engage a first recess formed adjacent the first end of the service blocker and wherein the second latching interface includes a second deflectable catch of the service blocker configured to engage a second recess formed on the fiber optic connector.

* * * * *